United States Patent [19]

Carrick

[11] 4,391,334

[45] Jul. 5, 1983

[54] HITCH ASSEMBLY

[75] Inventor: Lawrence K. Carrick, Spokane, Wash.

[73] Assignee: Calkins Manufacturing Company, Spokane, Wash.

[21] Appl. No.: 222,127

[22] Filed: Jan. 2, 1981

[51] Int. Cl.³ .............................................. A01B 59/04
[52] U.S. Cl. .................................... 172/326; 172/680; 280/474; 280/476 R
[58] Field of Search ............... 172/326, 327, 324, 396, 172/328, 467, 325, 680, 605; 280/474, 475, 476 R, 476 A, 493, 479 R, 479 A

[56] References Cited

U.S. PATENT DOCUMENTS

| | | | |
|---|---|---|---|
| 2,379,170 | 6/1945 | McDaniel | 280/476 R |
| 2,493,405 | 1/1950 | Hedgpeth | 280/476 R X |
| 2,651,858 | 9/1953 | Schwindt | 172/327 X |
| 2,780,158 | 2/1957 | Pursche | 172/222 |
| 2,818,664 | 1/1958 | Bond | 172/326 X |
| 2,830,519 | 4/1958 | Chandler | 172/226 |
| 3,202,225 | 8/1965 | Richardson | 172/328 |
| 3,777,823 | 12/1973 | Holfeld | 172/328 |

Primary Examiner—Richard J. Johnson
Attorney, Agent, or Firm—Wells, St. John & Roberts

[57] ABSTRACT

A hitch assembly for interconnecting an agricultural tool with a towing vehicle to allow relative angular vertical articulation between the tool and vehicle during use and to lock rigidly with the tool for transport. The hitch includes two pivotably interconnected frames. A first wheel supported frame is adapted to be connected to the towing vehicle. The second frame is adapted to be rigidly connected to the tool. A control mechanism operates from the vehicle hydraulic system and is connected between the frames. The mechanism is operative to lock the frames together rigidly or to unlock the frames for relatively free pivotal movement. The control means includes provisions for tipping the tool forward and downward as it is being lowered to a ground-working, operative position. The effective height of the frames can also be varied to correspond with the height of the tool at its ground-working operative position.

20 Claims, 14 Drawing Figures

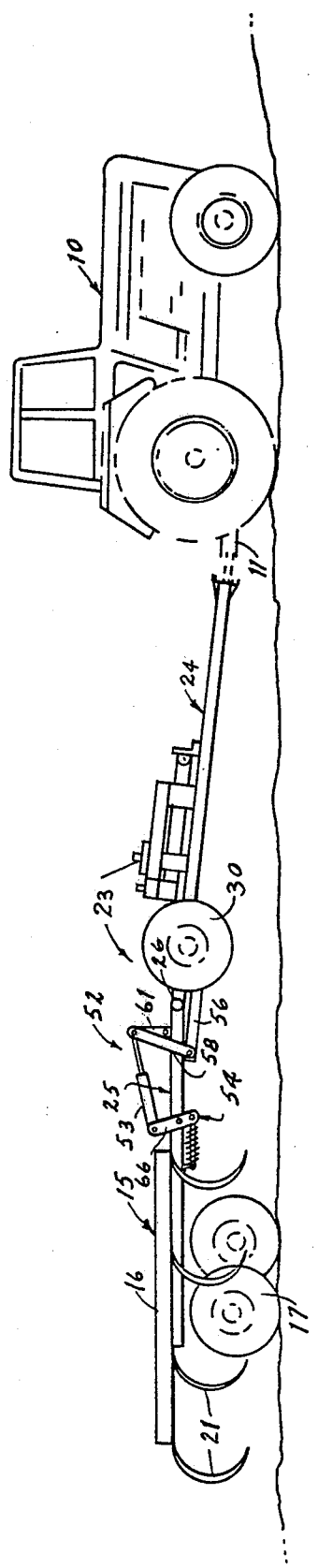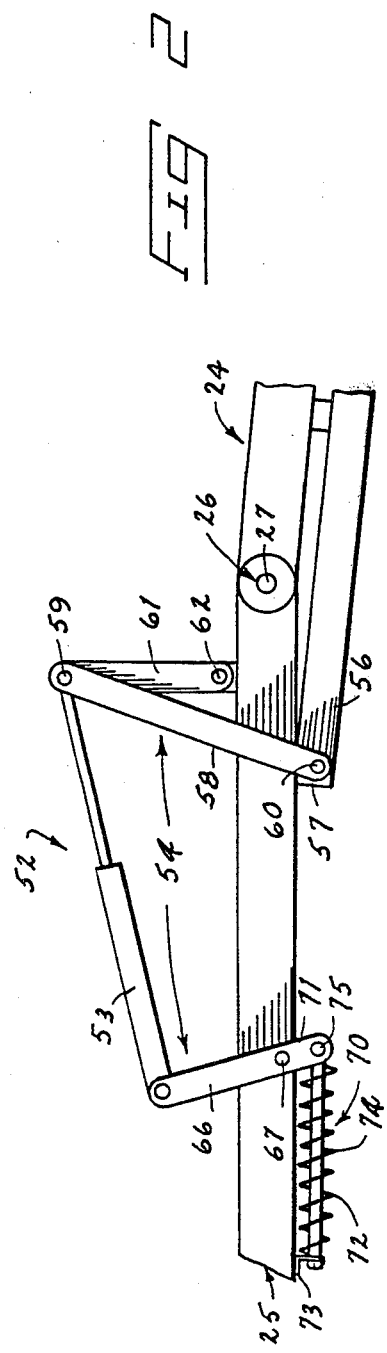

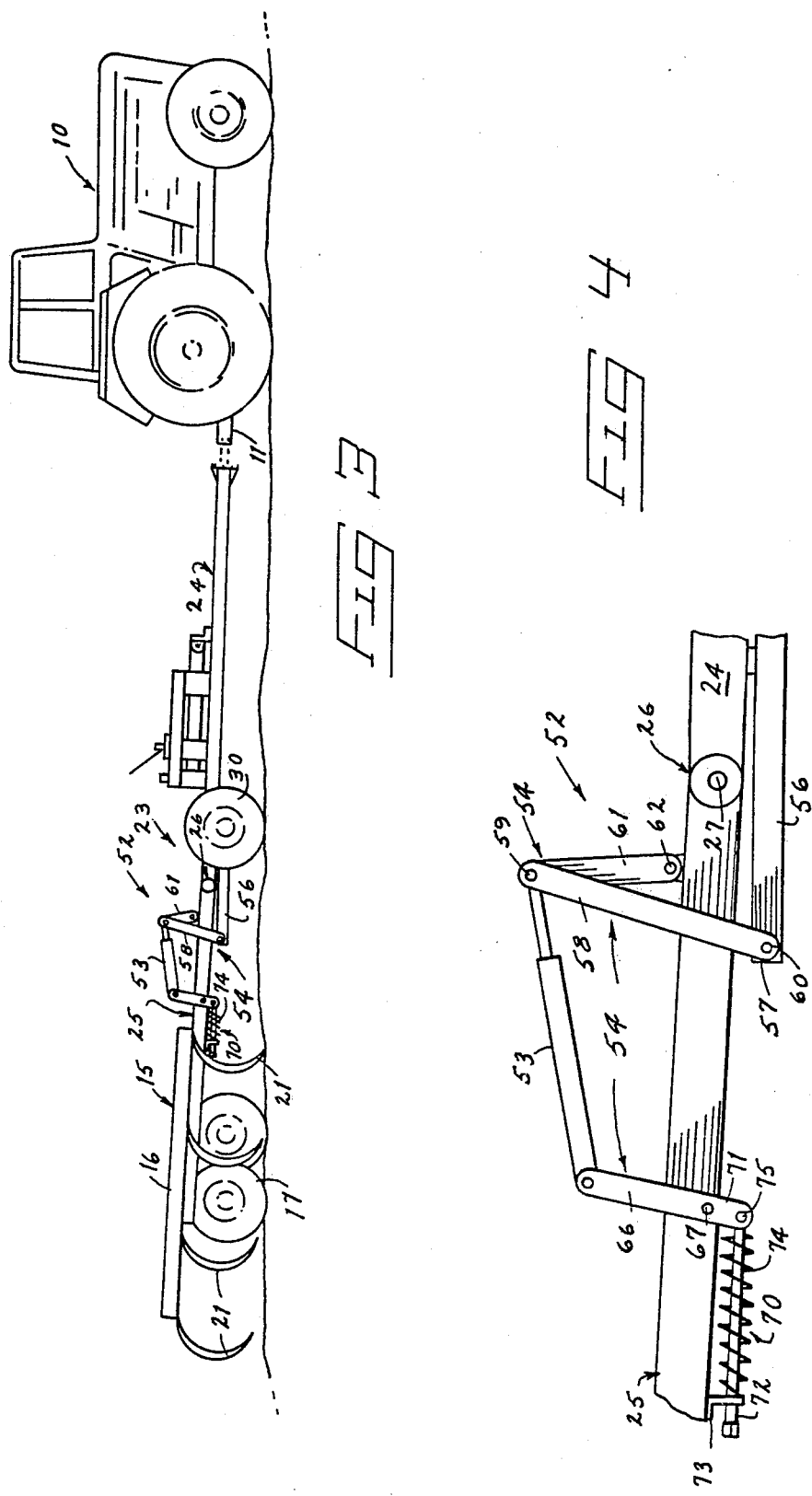

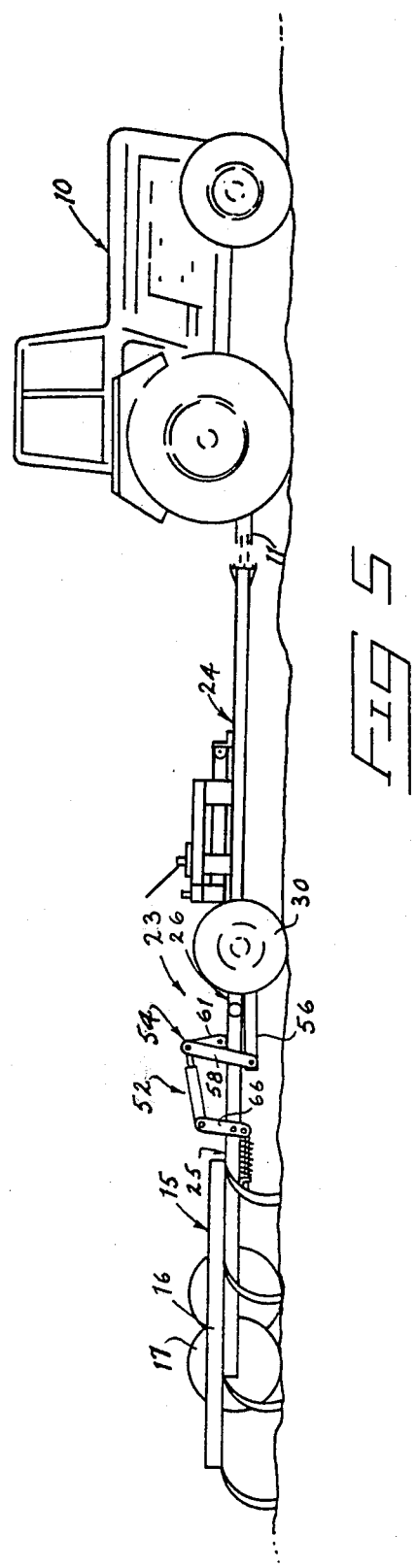
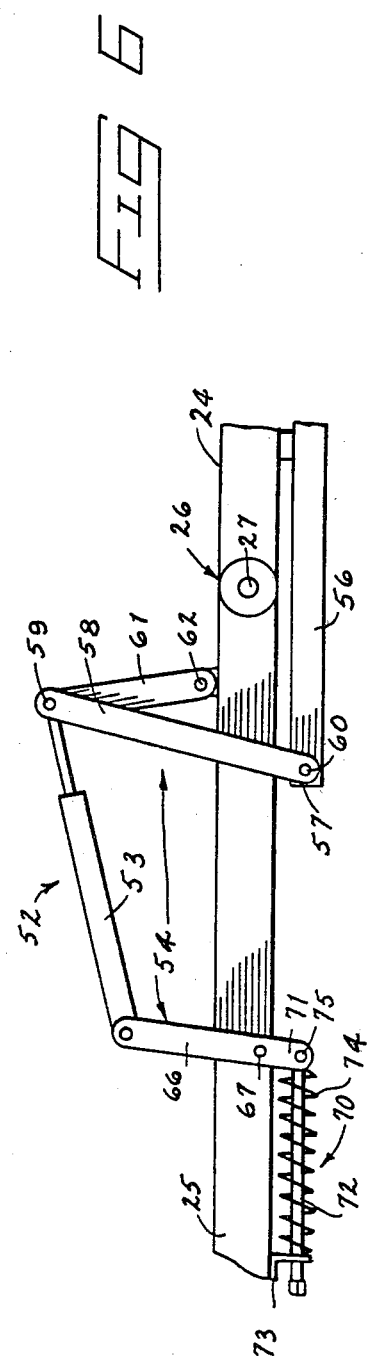

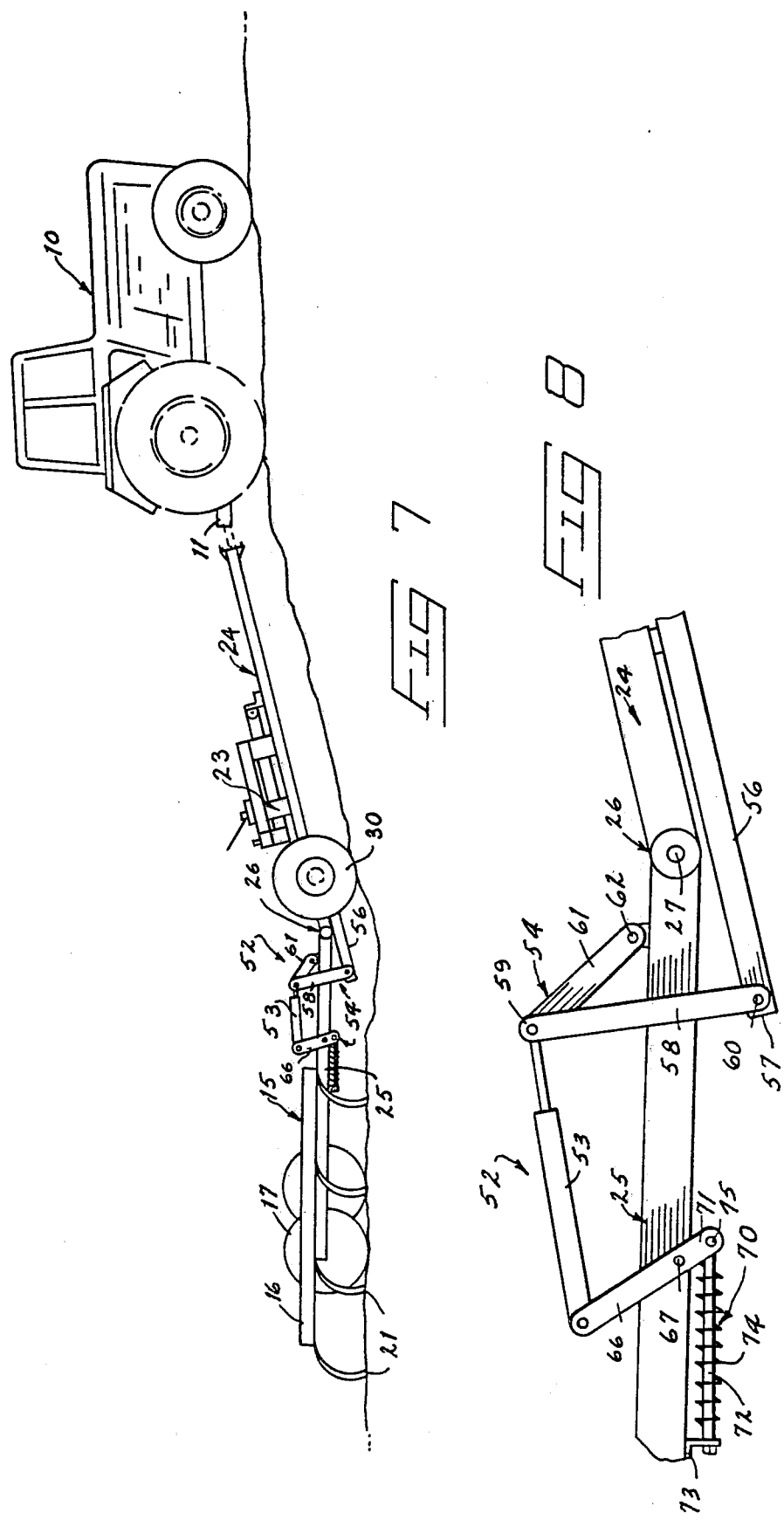

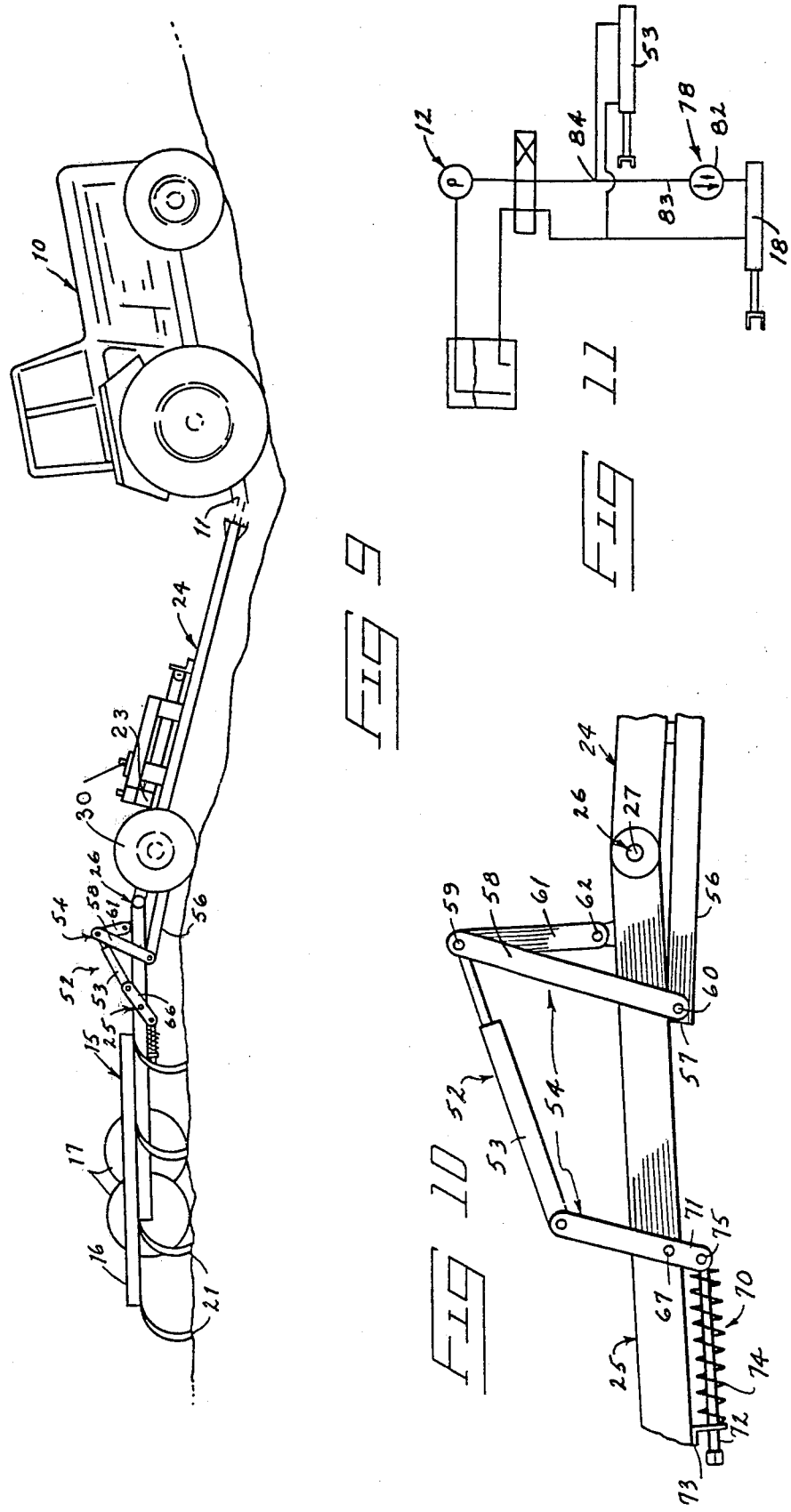

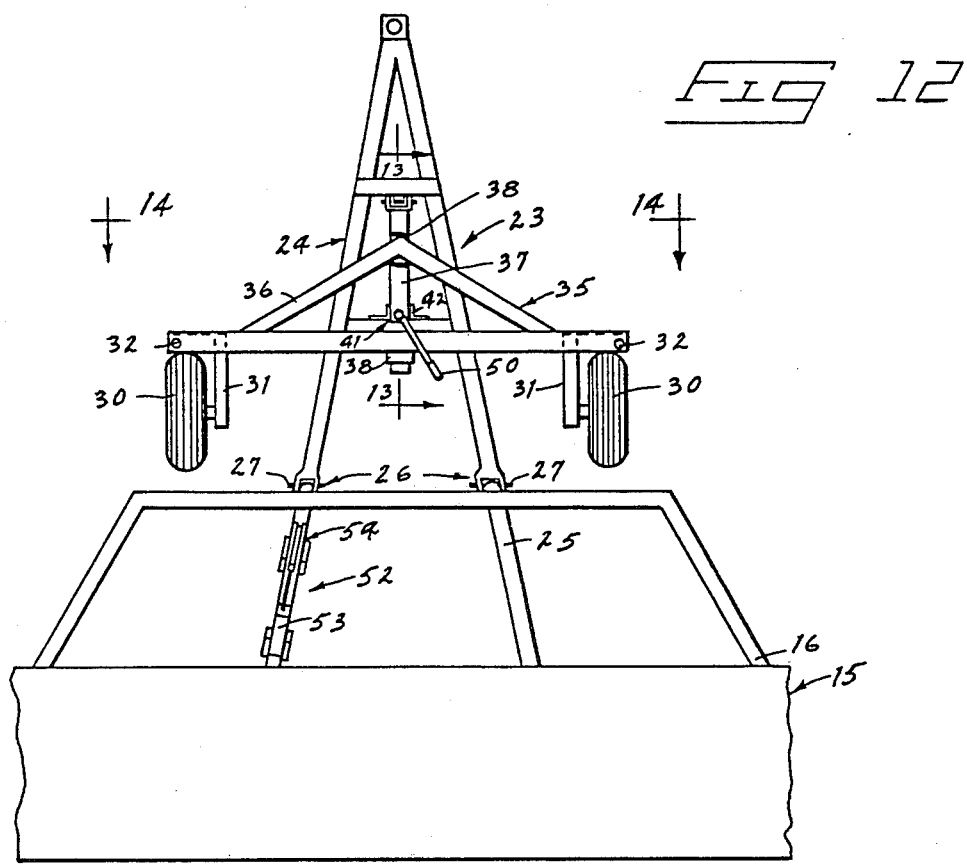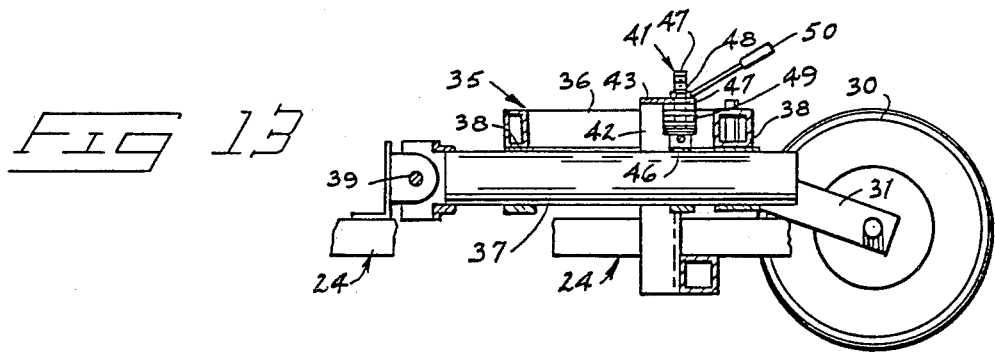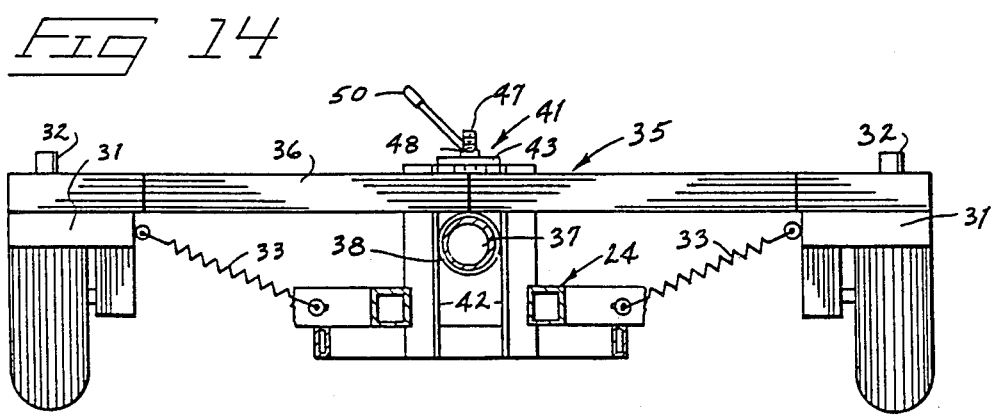

HITCH ASSEMBLY

BACKGROUND OF THE INVENTION

The present invention is related to hitch components that mount a towing vehicle to an agricultural tool to allow relative angular vertical articulation of the tool and towing vehicle.

For purposes of this disclosure, and as an aid in interpretation of the appended claims, the term "tool" should be taken to mean any unit of agricultural machinery that operates to perform a ground working function by use of implements moved along the ground by a towing vehicle. Examples of such "tools" are rod-weeders, harrows, plows, disc cultivators and the like. Examples of such implements are the rod of a rod weeder, the spring teeth of a harrow, the moldboard of a plow, and the discs of a cultivator.

Modern farm tractors have substantial pulling capability and can pull wide, heavy tools on frames that span transverse distances of sixty to seventy feet. Such tools substantially reduce the amount of time required in the field. The new, extra large tools are not without special problems, however, both during transport and when in use.

Transport of a tool from one field to another often requires travel on a public roadway. Load width requirements on such roads dictate that some special provision be made to reduce the overall width of a tool. In response, tools have been made to fold into a narrow transport configuration. The weight of the tool is therefore necessarily transferred to wheels set at the narrow, transport stance. The load on the wheels can often be in a somewhat precarious balance and care must be taken to assure that the load does not begin wobbling during transit.

Another difficulty with modern wide farm tools is experienced in the field. The tongue or hitch connector between the tool and towing vehicle must have a length about equal to one-half of the width of the tool in order to provide sufficient control at the lateral tool ends. Therefore, a tongue of approximately thirty feet would be preferred with a tool sixty feet wide. This relationship presents no problem when the tool is drawn along a flat surface. However, in rough or rolling terrain, significant problems occur when the tool is on one hillside slope and the towing vehicle is progressing along another. The ground-working implements are either levered into or out of the ground by the long tongue.

The obvious solution of providing a shorter tongue leads to even more difficult problems in controlling the progression of the tool around curves. Lateral stability of the tool ends decreases with decreasing length of the tongue or hitch.

Another solution has been the suggested use of a pivoted tongue or hitch between the tool and towing vehicle. Such an arrangement will function well during field usage, but has very serious drawbacks when the tool is to be transported.

There remains a need, therefore, for some form of hitch assembly that can be positioned between the towing vehicle and tool that will facilitate field usage of the wide tool and that will allow safe transport of the tool when folded to its transport condition.

The present invention answers the above need by providing a hitch assembly that allows relative elevational motion of the towing vehicle and tool when in field use and that secures the implement, thereby minimizing the dangers associated with large implement transport. Additionally, the present invention provides other important features, such as vertical height adjustment and capability for tipping the tool as it is lowered to an operating position.

The present invention can be provided in three basic forms to accomodate various needs of a user. First, the present invention can be provided as a separable hitch assembly, including frames that will mount directly between the tool and towing vehicle. The hitch assembly can therefore be provided as an option on new equipment provided without tongue assemblies or having removable tongue assemblies. Secondly, the present invention can be manufactured as an integral part of an agricultural tool. Finally, the present invention can be provided as an attachment for existing tools by adding it to the existing tongue assembly.

BRIEF DESCRIPTION OF THE DRAWINGS

FIG. 1 is a diagrammatic view of the present assembly in position between a tool and towing vehicle with the tool being carried in a transport position;

FIG. 2 is an enlarged fragmentary view of a control mechanism for the present hitch assembly illustrating the positions of the elements that correspond to the relationship of the hitch and tool shown in FIG. 1;

FIG. 3 is a diagrammatic view of the present hitch assembly showing it lowered and operating to tip the tool down and forwardly for initial ground contact;

FIG. 4 is a fragmentary detailed view of control components of the present hitch assembly that correspond to the relative positions of the hitch and tool shown in FIG. 3;

FIG. 5 is a diagrammatic view illustrating the present hitch assembly showing the tool lowered to an operative ground-working position along relatively flat ground;

FIG. 6 is a fragmentary detailed view of components for the present assembly in positions corresponding to the relationship of the tool and towing vehicle shown in FIG. 5;

FIG. 7 is a diagrammatic view of the present hitch assembly as the vehicle moves up an incline while the tool is moving horizontally;

FIG. 8 is a fragmentary detail view of components of the present assembly in positions correlating to the relationship between the tool and towing vehicle as shown in FIG. 7;

FIG. 9 is a diagrammatic view of the present hitch assembly showing it at a raised elevation and about to be pulled down an incline;

FIG. 10 is a fragmentary detail view of components for the present assembly in positions corresponding to the relationship of the tool and hitch assembly shown in FIG. 9;

FIG. 11 is a simplified hydraulic diagram illustrating the connection for the present control system within the conventional hydraulic circuit supplied between the towing vehicle and tool;

FIG. 12 is a top plan view of the present hitch assembly attached to a tool;

FIG. 13 is an enlarged sectional view taken along line 13—13 in FIG. 12; and

FIG. 14 is an enlarged sectional view taken along line 14—14 in FIG. 12.

DETAILED DESCRIPTION OF A PREFERRED EMBODIMENT

The present invention is intended for use with a towing vehicle, such as the tractor generally designated in the drawings by the number 10. For purposes of this description, the tractor 10 should include a rear towing hitch 11 and a hydraulic drive system 12 (FIG. 11).

The present assembly is also intended for use in conjunction with or as an integral part of a tool 15. Although other forms of tools can conceivably be used with the present invention, it is understood that prevalent use will be made with agricultural ground-working tools, such as the field cultivator shown schematically in the drawings. The tool 15 includes a rigid frame 16 and wheel supports 17. Hydraulic lift cylinders 18 (FIG. 11) may be connected between the frame and wheel supports and supplied with power from the hydraulic drive system 12 to raise or lower the attached ground-working implements 21 between inoperative positions above the ground surface (FIG. 1) and operative, ground-working positions (FIGS. 5, 7 and 9). Where a single ground-working implementation 21 is to be used (such as a single moldboard plow), the implement and frame may become integral in the tool.

The present hitch assembly is shown generally at 23 intermediate the tractor 10 and tool 15. The hitch assembly 23 connects to the hitch 11 at one end and to the tool frame 16 at an opposite end.

The hitch assembly may include two interconnected frame assemblies. A first elongated frame 24 has a forward end that is adapted for connection to the rear hitch 11 of the towing vehicle. A second frame 25 is pivotably connected to the first frame 24 and is rigidly attached to the implement frame 16. The second frame can be provided as an element of the hitch assembly or as an integral part of the tool frame.

A hinge 26 interconnects the frames 24 and 25 for pivotal movement about the horizontal axis of hinge pins 27. The pins 27 extend through brackets provided at the ends of the frames. The hinge or pin axis is horizontal and transverse to the longitudinal orientation of frames 24 and 25.

The first frame 24 may be supported by means of wheels 30 for rolling engagement along the ground surface when the tool is lowered to a ground-working position. When the tool is raised to an inoperative position as shown in FIG. 1, the wheels 30 are suspended along with the associated frames 24 and 25.

The wheels 30 are shown in FIGS. 12 through 14 mounted to the first frame 24 by caster frames 31. Caster frames 31 rotatably support the wheels and are each pivoted at 32. The pivots 32 are vertical to allow "caster" motion of the wheels along the ground surface. Tension return springs 33 (FIG. 14) are interconnected between the caster frames 31 and frame 24 to urge the wheels to a normal straight orientation aligned with the forward path of travel.

A suspension means 35 (FIGS. 12-14) mounts the wheels to the first frame to allow pivotal movement of the first frame and wheel means about a horizontal longitudinal axis. The suspension means 35 basically includes a rigid wheel frame 36 that mounts the caster frames 31. Cylindrical sleeves 38 are provided on a bottom surface of the wheel frame 36 to slidably receive the length of a longitudinal tube 37. The tube 37 is mounted to the first frame 24 at a pivot connection 39. Sleeves 38 allow pivotal motion of the wheel frame 36 about the longitudinal axis of the tube. The pivot connection 39 allows motion of the wheel frame and tube about a horizontal axis relative to the first frame 24.

Pivotal motion of the wheels and wheel frame about the axis of the tube 37 allows the frame to pivot laterally in response to sloping hillside conditions or irregular surfaces encountered on one side of the frame or the other without transmitting the same motion to the hitch frames. The hitch assembly can therefore remain in the same plane as the tool regardless of ground conditions.

The horizontal transverse axis of the tube pivot 39 also allows operation of a height adjusting means 41 shown in detail by FIGS. 13 and 14. The height adjusting means 41 is provided to allow selective adjustment of the hitch assembly elevation relative to the operating height of the tool frame when in use. The height adjusting means functions between the wheels 30 and the first frame to set the elevation of the frame 24 with respect to the tool frame and rigidly mounted second frame 25. It is preferred to maintain the tool frame and hitch frame 24 in horizontal alignment when in operation and during motion along level ground.

The height adjusting means 41 operates in conjunction with conventional shims (not shown) used on the piston shafts of the tool lift cylinders 18. Such shims can be added to or removed from a piston shaft in order to adjust the piston stroke length and, correspondingly, the elevational position of the wheels 17 relative to the tool frame 16.

The height adjusting means 41 includes an upright guide means 42 that slidably engages opposite sides of the tube 37 (FIG. 14). The guide means 42 will therefore permit only elevational movement of the tube about the axis of pivot 39. The guide means is formed of two upright posts interconnected at their top ends by a rigid plate 43.

A shaft 47 projects upwardly from a yoke 46 that rotatably receives the tube 37 (FIG. 13). The shaft 45 is threaded and protrudes through a hole 47 in the plate 43. The shaft threadably receives a nut 48 which can be turned against the plate to position the tube and wheel frame elevationally in relation to the first frame 24. Between the plate 43 and yoke 46 are one or more shims 49. The number of shims 49 used should correspond to the number of shims used along the length of the hydraulic lift cylinders 18. Through this arrangement, the working depth of the implements 21 set by the hydraulic lift cylinders 18 can be matched by the height adjusting means 41. The individual shims can be added or removed in correspondence with the same number of shims added to or removed from the cylinders 18. The nut 48 is turned to keep the skims in compact engagement between the plate 43 and yoke 46. For this purpose, a turning handle 50 can be rigidly affixed to the nut.

An important feature of the present invention is found in the control means 52 which is used to lock and unlock the frames 24 and 25 and to initially tip the tool 10 down to start the implements 21 into the ground (FIG. 3) as the tool is lowered. Additionally, the control means 52 allows free pivotal movement of the hitch frames about the axes of the pins 27, allowing angular vertical articulation between the tool and towing vehicle as shown in FIGS. 5 and 7.

FIG. 1 shows the control means operating to lock the first and second frames rigidly to one another when the tool is in a raised, transport condition. The locked frames will not allow pivotal movement about the axis of the pins 27 and will provide a greater safety margin for transport of the implement.

The control means 52 is shown in some detail by FIGS. 2, 4, 6, 8 and 10. It includes a hydraulic cylinder 53 connected to a linkage 54. The linkage 54 interconnects the first and second frames and the hydraulic cylinder to lock and unlock the frames in response to extension and retraction of the cylinder. The linkage also includes means for urging the second frame 25 and tool frame 16 forward and downwardly as the cylinder is contracted.

The linkage 54 includes a rigid abutment tongue 56 that extends forwardly and longitudinally from the second frame at a location below the first frame. The abutment tongue 56 is an elongated bar that is welded or otherwise rigidly attached to the second frame 25. See FIG. 2. It extends rearward to a free end 57 situated below the first frame for pivotal movement with the second frame about the axis of pins 27. The end 57 will come into abutment with the under surface of the first frame 24 when the frames are pivoted to the locked position shown in FIG. 2.

A link member 58 is included as part of the rigid bar linkage 54. Link member 58 extends upwardly from an end mounted by a pivot pin 60 to the abutment tongue 56. The opposed end of the link member 58 is pivotably connected at 59 to an upper end of a radius arm 61. The bottom end of the radius arm 61 is mounted at a pivot 62 to the second frame 25. The pivot 62 is situated on frame 25 rearward of the axis for hinge pins 27. Additionally, the link member and radius arm 58, 61 are arranged angularly to avoid a dead-center relationship with the pin 60 when the abutment end 57 is in contact with the second frame.

The pivot connection 59 between the radius arm and link member is joined by the piston end of hydraulic cylinder 53. The opposite end of the cylinder is mounted to the end of a rocker arm 66. Rocker arm 66 pivots about the axis of the pivot 67 in response to extension and retraction of the cylinder 53.

Biasing means is provided at 70 for urging the second frame and tool to tip forwardly and downwardly when the cylinder 53 is contracted (FIG. 3). Means 70 includes a portion of the rocker arm 66 extending at 71 below the frame 25. The lower rocker arm end 71 pivotably mounts the end of an elongated rod 72. The rod 72 is slidably mounted by a bracket 73 to the frame 25. Rod 72 includes a headed end on a side of the bracket opposite the rocker arm. A compression spring 74 is mounted about the rod between bracket 73 and end 71. The spring acts against the second frame to urge the second frame forward and downward when the cylinder is retracted. The spring also permits relative elevational articulation between the two frames when the tool is in use.

A cross bar abutment 75 mounts the rod end and engages the spring 74. The cross bar abutment pivotably supports rod 72 and restricts pivotal motion of the rocker arm 66. The limits of pivotal movement of the rocker arm are prescribed by the distance between frame 25 and the cross bar abutment 75. FIG. 8 shows the abutment at one extreme position while FIG. 4 shows it approaching its other extreme position.

FIG. 11 schematically illustrates the hydraulic drive system 12 and its connections with the cylinders 18 and 53. Also connected within the drive system is a means 78 for controlling flow of hydraulic fluid to the cylinders. Means 78 will initiate retraction of the cylinder 53 befoe similar operation of the tool lift cylinders 18.

Means 78 is comprised of a one way restrictor 82 placed in a hydraulic line 83 that leads from the vehicle hydraulic drive system to the base ends of the cylinders 18 and 53. The one way restrictor 82 is situated between a "T" 84 in the branch leading to the tool lift cylinders 18. The restrictor allows free flow of fluid to the cylinders 18 but allows only restricted return flow. Return flow from the cylinder 53 is unrestricted. Therefore, the cylinder 53 will contract substantially faster than the cylinders 18.

The restrictor assists means 70 to urge the frame downwardly to produce the starting orientation of the hitch and tool frame shown in FIG. 3. The tool is tipped down and forwardly in the starting position for positively engaging the implements 21 with the ground surface as the tool frame is lowered. The ground-working implements will then quickly penetrate the ground surface rather than "skipping" or scuffing along the ground surface before moving downward to the desired working depth.

The one way restrictor 82 is a conventional hydraulic component and can be easily fitted into existing hydraulic lines. Similarly, the lines leading to cylinder 53 can be easily incorporated within the existing hydraulic circuit.

The disclosure to this point has indicated that the hitch assembly of the present invention may be manufactured and sold as an "add on" for existing tools (the second frame being supplied with the "hitch" or as an integral part of the tool frame). Mounting of the hitch assembly would therefore entail removal of the existing hitch tongue and replacement with the present assembly. As noted earlier, however, the present invention can be provided integrally with the tool during the tool manufacturing stage, or as an attachment for tools wherein the existing hitch tongue is used to produce the present "first" and "second" frames.

Whatever form or application of the present invention is used, the resulting tools and hitch configuration will appear similar to that shown in the drawings. Assembly, of course, will vary with the form being used, varying from no required assembly in the premanufactured complete version to rather a complete modification and assembly effort required for attachment of the invention to an existing tool by modification of its existing hitch frames. In the latter, the hitch tongue is divided, usually by cutting, to produce the first and second hitch frames. These frames are then reconnected by the hinge 26. The remaining elements of the present invention are then mounted to the frames to produce a final assembly similar to that shown.

The second frame must be fixed to the tool. This is done by welding or bolting the second frame rigidly to the tool frame. The second frame might alternately be an integral component of the tool frame 16, in which case the tool frame must be modified in its original design to function as the second hitch frame 25.

The height adjusting means 41 can be adjusted to match the selected operating elevation of the frame and frame 24. The hinge, tool, frame and tractor hitch may therefore be level when in operation, (on level ground). This is done by adding or removing shims 49 along the shaft 45. Up or down movement of the shaft 45 results in corresponding elevational adjustment of the first frame 24. The hinge pins 27 are therefore elevated or lowered to correspond with the desired working height of the tool frame.

Another step in assembly, if the hitch components are being attached to an existing tool, is mounting of the "T"s and appropriate hydraulic lines in the hydraulic drive system 12 and placement of the one way restrictor 82. The hydraulic lines are then connected to the hydraulic drive system and the hitch is connected in the usual manner to the towing vehicle.

During transport to and from a field, the tool lift cylinders 18 and hitch cylinder 53 are actuated to hoist the ground-working implements 21 above the ground surface and to lock the frames 24 and 25 to the tool frame. The relationship of the tool and hitch assembly in this condition is shown best in FIG. 1. Here, the hydraulic cylinder 53 has been actuated to extend, causing the linkage to pivot in opposite directions at the opposite ends of the cylinder. The link 58 swings forward and upwardly, lifting the rigid abutment tongue 56 into locking engagement with the second frame 25. Similarly, the rocker arm 66 is pivoted rearwardly, causing the cross bar abutment 75 to pivot upwardly into engagement with the second frame 25. The first and second frames thus become rigidly locked together, so long as the cylinder 53 remains extended fully. It is noted that various "backup" forms of clamping or locking apparatus can be used to mechanically secure the two frames in the locked position once the cylinder 53 has been extended to reposition the two frames relative to one another.

The hydraulic lift cylinders 18 of the tool are actuated simultaneously with the cylinder 53 so the frame and ground-working implements of the tool are lifted in unison to the elevated condition. Other cylinders or actuators (not shown) can be operated at this time to place the tool in condition for roadway travel. The tool frame ends are typically lifted upwardly on hinge axes at points on the frame spaced apart by the allowable load width. The tool can then be safely towed to the selected field.

Once at the field, the tool frame can be "unfolded" to its operating width. When this is accomplished and the tool frame is secure, the hydraulic drive system can be operated to unlock the hitch assembly and lower the tool frame to the ground-working position. As this happens, the restrictor 82 inhibits return flow from the implement lift cylinders 18. Similar flow from the cylinders 53 is unrestricted. Therefore, the cylinder 53 will retract completely before similar retraction of the implement cylinders 18.

The rigid bar linkage is again pivoted in response to the retracting cylinder 53. The first frame becomes initially supported on the ground as the wheels 30 are lowered to the ground surface. The weight of the frame as it is lowered will cause the radius arm 61 and link 58 to pivot rearward and downwardly until the wheels 30 engage the ground surface.

The weight of the first frame acting against the hinge 26 will initially cause a slight down and forward tipping of the tool frame. However, the tipping action is accomplished primarily as the cylinder 53 continues to contract after engagement of the wheel means 30 with the ground surface.

Once wheels 30 touch ground, the cylinder 53 continues to contract and urge the link 58 downward. The link presses downward against the abutment 56. The wheel axis then becomes a fulcrum with the downward force of the link 58 against the abutment on one side producing a lifting force against the tractor at the other side. The weight of the tractor cannot be lifted, so the radius arm 61 and link 58 will remain relatively stationary as the cylinder continues to contract. The rocker arm 66 is therefore pivoted forwardly, pressing the cross bar abutment 75 against the spring 74. The spring resistance acts through the cylinder 53 and rigid bar linkage 54 against the second frame and tool to tip the tool slightly downwardly as it is lowered to engage the ground surface. Preferably, this sequence of events occurs during a slow forward motion of the towing vehicle. The downwardly inclined implements 21 will therefore dig easily and quickly into the ground surface to the desired working depth.

The cylinder 53 remains in the contracted condition along with the lift cylinders 18 throughout operation of the tool. The linkage 54, during this time, will pivot relatively freely in response to angular articulation of the first and second frames 24, 25.

FIGS. 5 and 6 illustrate the relationship of the linkage 54 and frames 24 and 25 while the tool is being drawn along relatively flat ground. Here, the hitch frames and tool frame are in substantial horizontal alignment. The tool frame is allowed to tip back upwardly to the horizontal orientation as the ground-working implements become engaged at the working depth and resistance of the spring 74 is overcome.

FIG. 7 illustrates the relationship of the frames and linkage when the tractor begins movement up an incline while the trailing tool is still on a relatively horizontal surface. Here, the first frame 24 pivots upwardly about the hinge 26 while the second frame remains substantially horizontal. This motion is allowed by the bar linkage 54 as the radius arm 61 and link 58 are pulled back and downward by the abutment 56. The rocker arm 66 is pivoted rearwardly by the rigid, contracted cylinder 53. There is no resistance offered to this motion through the control means 52. The tool is allowed to move along the horizontal direction until it encounters the incline. Then the tool frame (and second frame 25) will be tipped upwardly parallel to the incline and into a normal aligned configuration with the first hitch frame.

FIGS. 9 and 10 illustrate the relationship of the present hitch assembly and tool when the towing vehicle has moved over a downward incline and the tool subsequently approaches the downward incline along a relatively horizontal surface. In this situation, the first frame 24 pivots downwardly about the axis of the hinge 26, allowing the second frame and tool frame to remain horizontal. This motion is accommodated by the linkage 54 wherein the link 58 is pivoted upwardly by the abutment 56 and the radius arm 61 is correspondingly pivoted forwardly. This motion is transmitted through the retracted cylinder 53 to the rocker arm 66. The rocker arm 66 will pivot forwardly. This motion will, at times, be resisted by compression spring 74. However, the spring does not have sufficient compressive resistance to alter the orientation of the working tool.

Continued forward motion of the towing vehicle down the incline or up a subsequent incline as shown in FIG. 9, will result in the tool moving from the horizontal ground surface to the incline. As this happens, the first frame will pivot relative to the second frame about the hinge axis back to normal aligned positions and the tool will maintain the selected working depth for its implements 21.

Lateral changes of elevation are accommodated by the suspension means 35. The wheel frame 36 will pivot about its longitudinal axis, leaving the first frame 24 substantially coplanar with the second frame 25 and tool frame 16. The wheel frame will "walk" freely over uneven ground surface without affecting the angular orientation of the hitch assembly. There is therefore no twisting or torsional force applied at the point of connection to the towing vehicle or to the attached tool.

When the operation is complete, the hydraulic drive system 12 can be actuated, causing the cylinders 18 and 53 to extend. This causes corresponding lifting of the tool frame and implements from the ground and locking of the control means to secure the first and second hitch assembly frames 24 and 25 back into the transport position shown in FIG. 1.

The above description and attached drawings are given by way of example to set forth a form of the present invention falling within the scope of the following claims.

What I claim is:

1. A ground-working tool for attachment to a towing vehicle, comprising:
   a first longitudinal hitch frame having a front end adapted for connection to the towing vehicle, and a rear end;
   a second longitudinal hitch frame;
   hinge means mounting the rear end of the first longitudinal hitch frame to the second hitch frame for relative pivotal movement about a horizontal transverse axis;
   a ground-working implement operatively mounted to the second hitch frame;
   lift means on the second hitch frame for moving the ground working implement between an elevated inoperative position above the ground-working surface and an operative position engaging the ground
   wherein the lift means is comprised of a ground-engaging wheel and hydraulic cylinder means on the second hitch frame, mounting the wheel to the second hitch frame and selectively operable to raise and lower the second hitch frame and attached implement between the operative and inoperative positions;
   control means operably connected with the hydraulic cylinder means to operate in conjunction with operation of the hydraulic cylinder means for alternately operating to (a) lock the first and second hitch frames together when the ground-working implement is in the elevated inoperative position; (b) tip the second hitch frame and ground-working implement downward and forwardly as the support means is operated to move the ground-working implement to its operative position engaging the ground; and (c) permit pivotal movement between the hitch frames relative to one another about the hinge axis after the ground-working implement has been moved to its operative position;
   wheels movably holding the first hitch frame at a selected elevation; and
   suspension means between the wheels and first hitch frame mounting the wheels to the first hitch frame for pivotal movement about a longitudinal axis.

2. The ground-working tool as claimed by claim 1 wherein the control means includes:
   a linkage pivotally interconnected between the first and second hitch frames; and
   a hydraulic linkage cylinder having opposed ends operatively connected to the linkage, said hydraulic linkage cylinder being operatively connected to the hydraulic cylinder means on the second hitch frame to (a) lock the hitch frames together when the hydraulic cylinder means has been operated to raise the implement and second hitch frame to the operative position; and (b) to unlock the hitch frames for relative pivotal movement about the hinge axis.

3. The ground-working tool as claimed by claim 2 further comprising biasing means responsive to movement of the hydraulic linkage cylinder and attached linkage to unlock the first and second hitch frames, for urging the second hitch frame and the ground-working implement to tip downwardly as the hydraulic cylinder is operated to unlock the hitch frames.

4. The ground-working tool as claimed by claim 3 further comprising restrictor means between the hydraulic cylinder means and hydraulic linkage cylinder for causing operation of the hydraulic linkage cylinder to unlock the frame before the hydraulic cylinder means is operated to lower the second hitch frame.

5. The ground-working tool as claimed by claim 1 further comprising height adjustment means between the suspension means and first hitch frame for adjusting the elevation of the first hitch frame.

6. The ground-working tool as claimed by claim 5 wherein the suspension means includes a wheel frame connecting the wheels to the first hitch frame for pivotal motion thereon about the longitudinal axis; and
   wherein the height adjustment means includes a threaded shaft interconnecting the first frame and wheel frame, and removable shim means mountable to the shaft between the first frame and wheel frame to set the elevation of the first frame relative to the ground surface.

7. The assembly as claimed by claim 1 wherein the suspension means is comprised of:
   a wheel frame mounting the wheels to the first hitch frame;
   a longitudinal tubular member mounted to the first frame for pivotal movement about a horizontal transverse axis and having a central longitudinal axis;
   a sleeve member on the wheel frame slidably received on the tubular member to allow pivotal motion of the wheel frame about the longitudinal axis of the tubular member.

8. The assembly as claimed by claim 7 further comprising a height adjusting means for selectively adjusting the elevation of the first hitch frame relative to the ground surface, comprising:
   upright guide means on the first frame for engaging and guiding the tubular member elevationally;
   a threaded shaft mounted to the tubular member for free rotation about the axis of the tubular member; and
   nut means interconnecting the threaded shaft and the first frame for selectively spacing the first hitch frame and wheel frame apart elevationally about the horizontal transverse axis.

9. The assembly as claimed by claim 8 further comprising shim means selectively mountable over the shaft between the first frame and wheel frame.

10. A ground-working tool for attachment to a towing vehicle, comprising:

a first longitudinal hitch frame having a front end adapted for connection to the towing vehicle, and a rear end;

a second longitudinal hitch frame;

hinge means mounting the rear end of the first longitudinal hitch frame to the second hitch frame for relative pivotal movement about a horizontal transverse axis;

a ground-working implement operatively mounted to the second hitch frame;

lift means on the second hitch frame for moving the ground-working implement between an elevated inoperative position above the ground-working surface and an operative position engaging the ground, comprised of a ground-engaging wheel and hydraulic cylinder means on the second hitch frame, mounting the wheel to the second hitch frame and selectively operable to raise and lower the second hitch frame and attached implement between the operative and inoperative positions;

control means operably connected with the hydraulic cylinder means to operate in conjunction with operation of the hydraulic cylinder means for alternately operating to (a) lock the first and second hitch frames together when the ground-working implement is in the elevated inoperative position; (b) tip the second hitch frame and ground-working implement downward and forwardly as the support means is operated to move the ground-working implement to its operative position engaging the ground; and (c) permit pivotal movement between the hitch frames relative to one another about the hinge axis after the ground-working implement has been moved to its operative position;

wherein the control means includes (a) a linkage pivotally interconnected between the first and second hitch frames; and (b) a hydraulic linkage cylinder having opposed ends operatively connected to the linkage, said hydraulic linkage cylinder being operatively connected to the hydraulic cylinder means on the second hitch frame to lock the hitch frame together when the hydraulic cylinder means has been operated to raise the implement and second hitch frame to the operative position, and to unlock the hitch frames for relative pivotal movement about the hinge axis;

biasing means responsive to movement of the hydraulic linkage cylinder and attached linkage to unlock the first and second hitch frames, for urging the second hitch frame and the ground-working implement to tip downwardly as the hydraulic linkage cylinder is operated to unlock the hitch frames; and restrictor means between the hydraulic cylinder means of the lift and the hydraulic linkage cylinder of the control means for causing operation of the hydraulic linkage cylinder to unlock the frame before the hydraulic cylinder means is operated to lower the second hitch frame.

11. An attachment for a ground-working tool having a wheel supported frame and a hydraulic lift for raising or lowering the frame relative to the ground surface, the frame including an elongated longitudinal tongue extending forwardly to an end for attachment to a towing vehicle, said attachment comprising:

hinge means adapted to divide the tongue into a first hitch frame and a second hitch frame and to join the frames together about a transverse hinge axis;

control means adapted to operably interconnect the first and second hitch frames and to alternately (a) lock the first and second hitch frames to one another, and (b) tip the second hitch frame downwardly and forwardly relative to the first hitch frame, or (c) permit pivotal movement between the first and second frames relative to one another about the transverse hinge axis;

wheels adapted to movably hold the first hitch frame at a selected elevation;

suspension means adapted to be mounted between the wheels and first hitch frame for mounting the wheels to the first hitch frame for pivotal movement about a longitudinal axis; and height adjustment means adapted to fit between the suspension means and first hitch frame for adjusting the elevation of the first hitch frame.

12. The attachment as claimed by claim 11 wherein the control means is comprised of:

a linkage adapted to be pivotably interconnected between the first and second hitch means; and hydraulic cylinder having opposed ends operatively connected to the linkage and being movable between a first condition adapting the linkage to lock the first and second frames to one another and a second condition wherein the linkage is adapted to permit relative pivotal motion of the first and second frames about the transverse axis.

13. The attachment as claimed by claim 12 wherein the linkage is comprised of:

a radius arm having a base end adapted to be pivotably mounted to one of the hitch frames divided by the hinge means;

a link member pivotably mounted to the radius arm at an end thereof remote from its base and adapted to pivotably connect the radius arm with the remaining hitch frame;

a rocker arm adapted to be pivotably mounted to the one hitch frame and extending to a free end; and wherein the hydraulic cylinder is mounted between the free end of the rocker arm and the link member.

14. The attachment as claimed by claim 13, further comprising:

connector means adapted to hydraulically interconnect the hydraulic cylinder with the hydraulic lift of the ground-working tool so the cylinder and lift will operate together.

15. The attachment as claimed in claim 11 further comprising restrictor means within the connector means for assisting operation of the control means to tip the second hitch frame downwardly as the hydraulic lift is operated to lower the wheel supported frame.

16. The attachment as claimed by claim 11 wherein the suspension means includes a wheel frame adapted to connect the wheels to the first hitch frame for pivotal motion thereon about the longitudinal axis; and wherein the height adjusting means includes a threaded shaft adapted to interconnect the first frame and wheel frame, and removable shim means adapted to mount to the shaft between the first frame and wheel frame to set the elevation of the first frame relative to the ground surface.

17. The attachment as claimed by claim 11 wherein the control means is comprised of:

a linkage pivotably interconnecting the first and second frames, including;

a radius arm having a base end pivotally mounted to one of the hitch frames;

a link member pivotably mounted to the radius arm at an end thereof remote from the base end, pivotably connecting the radius arm with the remaining hitch frame;

a rocker arm pivotably mounted to the one hitch frame and extending to a free end;

an extensible cylinder mounted between the free end of the rocker arm and the link member and movably between a first condition wherein the linkage locks the first and spaced hitch frames together and a second condition wherein the linkage will permit pivotal movement between the first and second hitch frames relative to one another about said axis.

18. The attachment as claimed by claim 17 wherein the radius arm and rocker arm are mounted to the second hitch frame.

19. The attachment as claimed in claim 17 wherein the extensible cylinder is a hydraulic cylinder, and wherein the rocker arm includes an abutment surface thereon for engaging the one hitch frame to restrict pivotal movement of the rocker arm in response to movement of the extensible cylinder.

20. The attachment as claimed by claim 17 wherein the remaining hitch frame includes an abutment thereon for engagement with the one hitch frame to restrict angular pivotal movement thereof about the hinge axis.

* * * * *